United States Patent
Lu

(10) Patent No.: US 6,282,205 B1
(45) Date of Patent: *Aug. 28, 2001

(54) DIGITAL AUDIO-VIDEO NETWORK SYSTEM

(76) Inventor: Simon Lu, 3555 S. Dartmouth La., Rowland Heights, CA (US) 91748

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,082

(22) Filed: Sep. 2, 1997

(51) Int. Cl.[7] .............................. H04L 12/28; G06F 11/26
(52) U.S. Cl. .................... 370/465; 370/469; 345/504; 348/13; 709/208
(58) Field of Search ................... 370/389, 422, 370/425, 465, 469, 470, 471, 474; 345/501, 502, 503, 504; 348/12, 13, 14, 17, 423, 466, 467, 470, 571, 572, 606, 607; 709/208; 714/746, 799; 340/825.22, 825.24, 825.25, 3.1, 3.5

(56) References Cited

U.S. PATENT DOCUMENTS

| | | | |
|---|---|---|---|
| 4,602,343 | * | 7/1986 | Dougherty ........................ 364/505 |
| 4,893,340 | * | 1/1990 | Lubarsky et al. .................... 380/50 |
| 5,483,535 | * | 1/1996 | McMillen et al. .................. 370/463 |
| 5,488,357 | * | 1/1996 | Sato et al. ...................... 340/825.25 |
| 5,519,641 | * | 5/1996 | Beers et al. ..................... 364/514 C |
| 5,548,725 | * | 8/1996 | Tanaka et al. ................. 395/200.05 |
| 5,619,650 | * | 4/1997 | Bach et al. ......................... 370/469 |
| 5,796,423 | * | 8/1998 | Robbins et al. ...................... 348/10 |
| 5,812,786 | * | 9/1998 | Seazholtz et al. ............. 395/200.63 |
| 5,838,913 | * | 11/1998 | Lysejko et al. ................ 395/200.38 |
| 5,883,621 | * | 3/1999 | Iwamura .............................. 345/327 |
| 5,982,783 | * | 11/1999 | Frey et al. ........................... 370/467 |

* cited by examiner

Primary Examiner—Alpus H. Hsu
(74) Attorney, Agent, or Firm—Ronald E. Smith; Smith & Hopen, P.A.

(57) ABSTRACT

A digital central control unit is connected in a master/slave relationship to a plurality of audio, video, and data components, at least one of which may be an analog component. A decoder digital-to-analog unit is positioned at the input of all analog components so that signals transmitted to them from the central control unit are not decoded and converted to analog signals until after the transmission has been completed. An encoder analog-to-digital unit for converting analog signals to digital signals is positioned at the output of each analog component so that their respective analog signals are in encoded digital format when being transmitted to the central control unit. The network is thus all-digital and is therefore not subject to the limitations of networks having analog transmission lines.

23 Claims, 8 Drawing Sheets

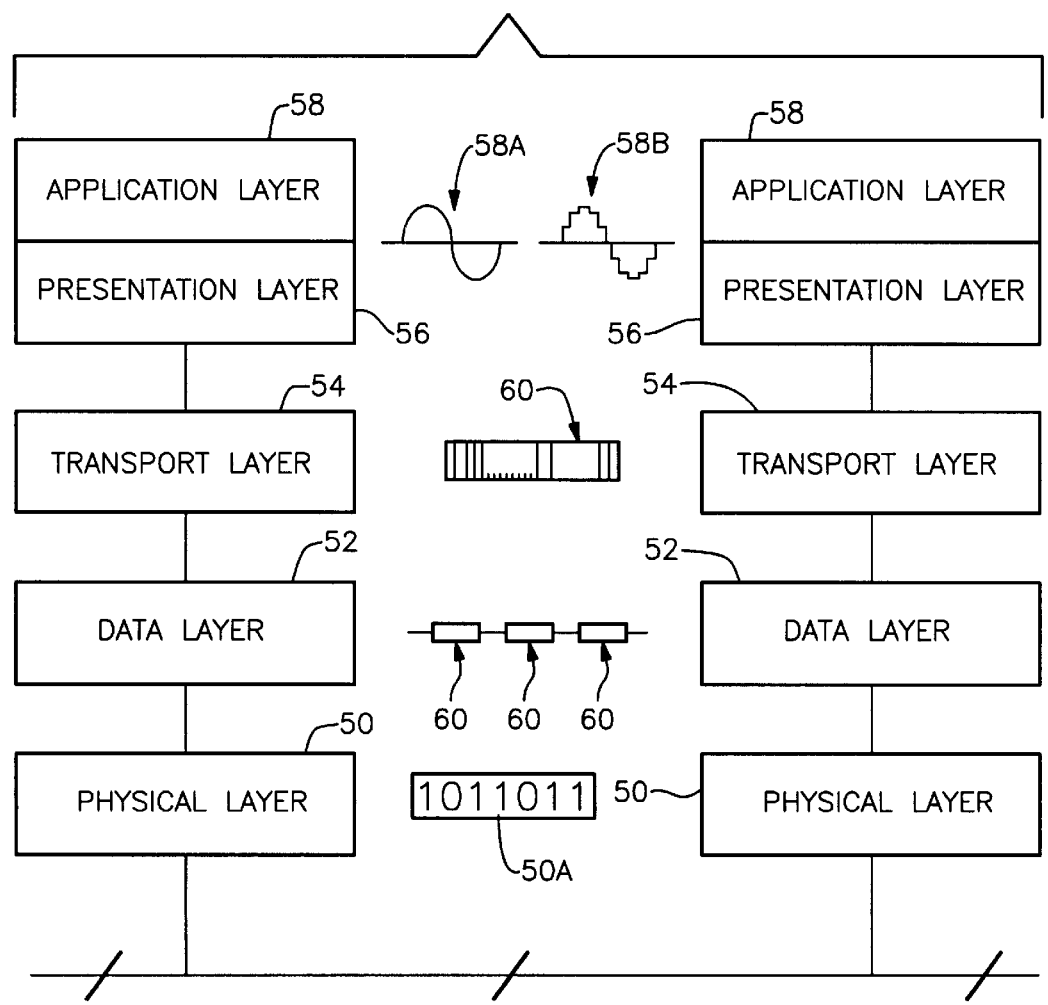

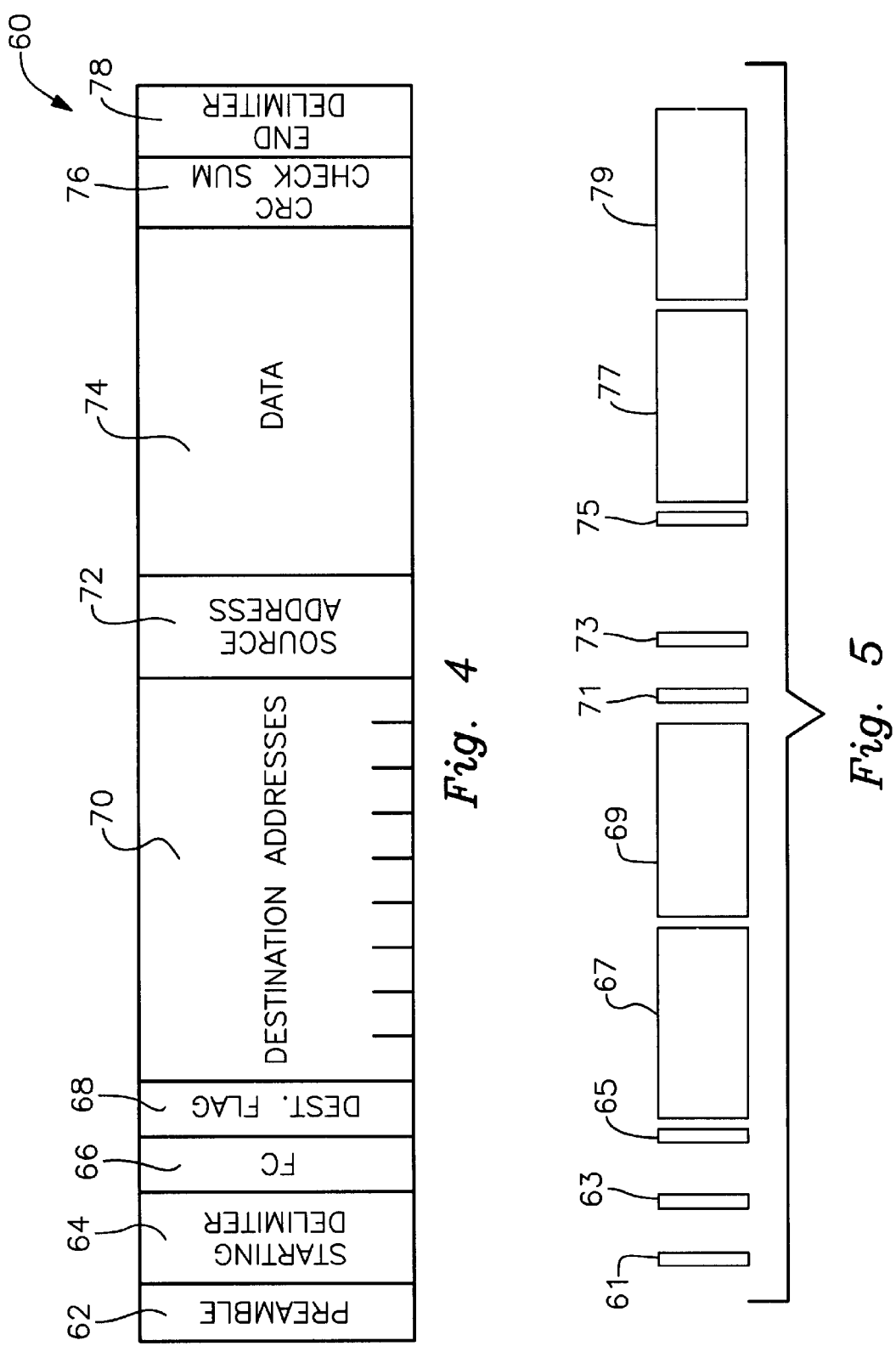

DIGITAL AUDIO-VIDEO NETWORK SYSTEM

BACKGROUND OF THE INVENTION

1. Field of the Invention

This invention relates, generally, to an apparatus for interconnecting audio, video, and data components. More particularly, it relates to an apparatus that eliminates the noise and errors that occur during analog data transmission between such components.

2. Description of the Prior Art

A conventional audio component such as a speaker is connected to a source of audio signals by wires that carry analog signals. The speaker must therefore be positioned in relatively close proximity to the source of the audio signals if signal attenuation is to be minimized. However, even if the speaker is positioned in close proximity to the source of audio signals, the analog signal transmission will be imperfect. Moreover, extraneous noise will be induced because it is not possible to perfectly shield the wires that extend from the signal source to the speaker. Furthermore, there are many audio, video, or data components where more than one wire is required to make the interconnection. Where there are a relatively large number of audio and video components to be interconnected, such as in a home entertainment center having a television set (which may be of the analog or digital type and which may include a video monitor and the like), a VCR, a CD player, a DVD player, a casette tape player, a radio tuner, a television tuner, a graphics equalizer, and the like, the number of wires is quite high and the connections are rather complicated and messy.

Another drawback of the present system for interconnecting components is that the number of components that may be interconnected is limited. Once the "audio in," "audio out," "video in," and "video out" ports of a component such as a VCR have been occupied, no further connections can be made.

What is needed, then, is a means for reducing or eliminating signal transmission errors of the type that occur in analog environments, for reducing or eliminating the amount of noise that exists in a conventional set up of multiple components that includes analog components, a means for reducing the number of wires in such a set up so that intallation complexity is reduced, a means that would enable various audio, video, or data components to be widely spaced apart from their respective signal sources and from each other, a means for providing positive communication between the various components of such a system, and a means for increasing the number of components that may be interconnected.

However, in view of the art considered as a whole at the time the present invention was made, it was not obvious to those of ordinary skill in this art how these desireable ends could be attained.

SUMARY OF THE INVENTION

The longstanding but heretofore unfulfilled need for an apparatus that overcomes the limitations of the prior art is now met by a new, useful, and nonobvious invention. The present invention includes an apparatus interconnecting a network of components in a master/slave relationship so that each component is controlled by the master. The apparatus is called a Digital Audio-Video Network System (DAVieS) and includes a central control unit for controlling a plurality of components. The central control unit has digital internal circuitry.

At least one component of the plurality of components has analog internal circuitry. A single physical transmission path for interconnecting the central control unit to each component of the plurality of components is provided. The transmission paths is in the form of a predetermined signal transmission media, and at least one decoder D/A (digital-to-analog) unit, hereinafter referred to as a DDA means, is provided for decoding and converting digital signals from the central control unit to decoded analog signals at the input of said at least one component having analog internal circuitry. Said at least one DDA means is positioned at the input of said at least one component and there may be as many DDA means as there are components having internal analog circuitry.

At least one A/D (analog-to-digital) encoder unit, hereinafter referred to as an ADE means, is provided for encoding and converting analog signals from said at least one component having analog internal circuitry to encoded digital signals, and said at least one ADE means is positioned at the output of said at least one component having analog internal circuitry. There may be as many ADE means as there are components having analog internal circuitry.

The components of any DAVieS may include input devices, output devices, and input/output devices. An ADE means will be positioned between the DAVieS and all input devices, such as an FM radio with an independently controlled tuner, for example. A DDA means will be positioned between the DAVieS and all output devices, such as a speaker, for example. Both ADE and DDA means will be positioned between the DAVieS and all input/output devices, such as a TV tuner, for example.

The DDA meanss and the ADE means are under the control of the central control unit so that no signal travels from a component to the central control unit unless the central control unit commands a component to send a signal and so that no signal travels between components in the absence of a command from the central control unit. The central control unit is adapted to transmit digital commands to the components in accordance with a predetermined communication protocol.

Accordingly, all transmission and command signals in the network are digital. Thus, noise arising from analog signal transmission is eliminated, external induced noise is eliminated or substantially attenuated, the components may be remotely positioned from the central control unit and from each other without introducing noise, the wiring of the audio and video system is simplified, and the number of components that may be connected to the network is limitless for all practical purposes.

It is a primary object of this invention to overcome many of the limitations associated with analog transmission of signals in audio and video systems.

A more specific object is to provide an apparatus for interconnecting audio and video components that reduces signal transmission errors.

Another specific object is to provide an apparatus for reducing external induced noise in such a system.

Another object is to provide an interconnection system that would reduce the number of wires employed to set up a video and audio component system.

Still another object is to facilitate remote placement of components with respect to their respective sources of signals and with respect to each other.

It is also an object to provide a means for components to communicate with each other.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 3 diagrammatically depicts the five layer communication protocol of the novel digital stereo network;

FIG. 4 depicts a data frame of said network;

FIG. 5 depicts the data frames when in use;

DETAILED DESCRIPTION OF THE PREFERRED EMBODIMENT

Figure 1:
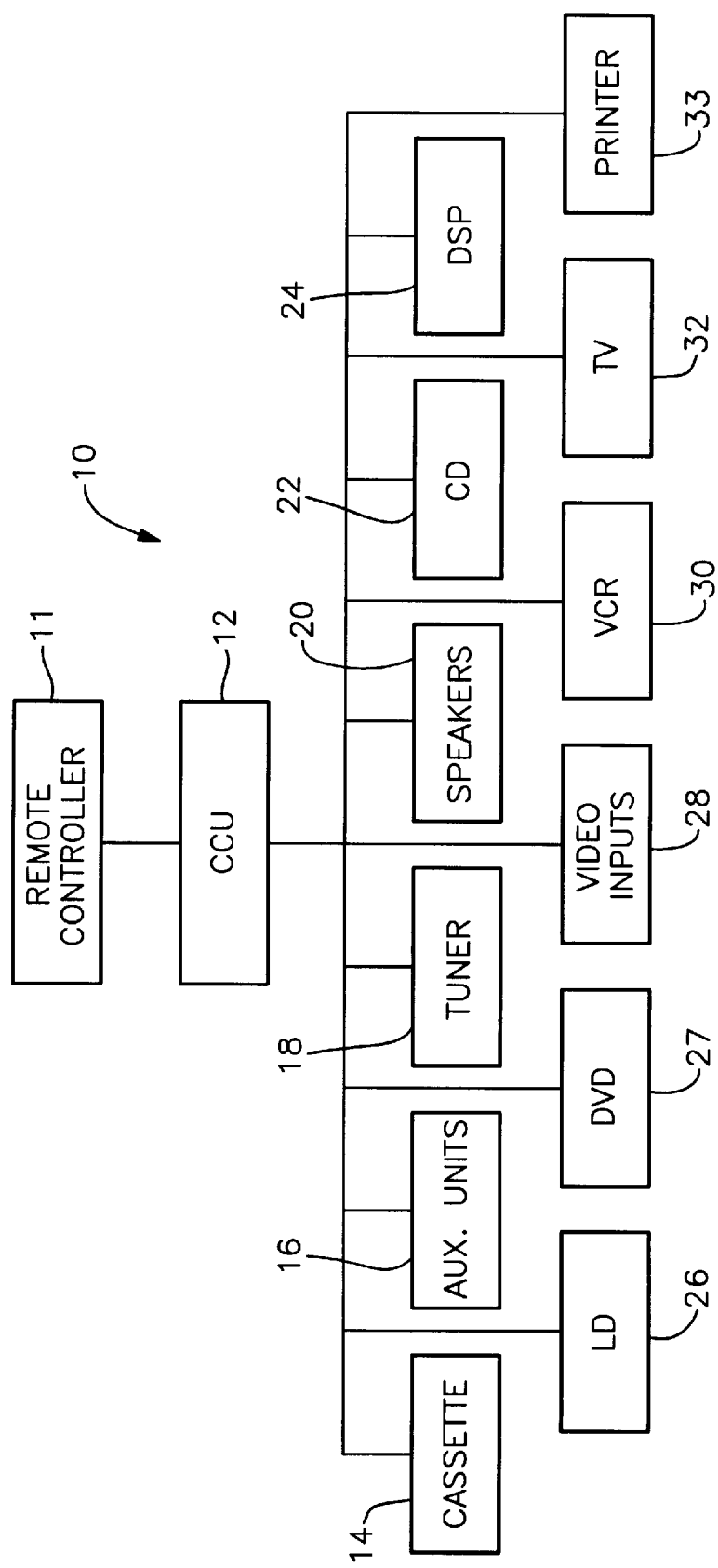
FIG. 1 is a high level diagram of the novel system.

Referring now to FIG. 1, it will there be seen that an exemplary embodiment of the invention is denoted as a whole by the reference numeral 10.

The novel Digital Audio-Video Network System (DAVieS) 10 includes a remote control unit 11, a central control unit (CCU) 12, and a plurality of components having analog internal circuitry (such as a stereo speaker) or digital internal circuitry (such as a CD player).

As can be appreciated from FIG. 1, the architecture of the novel system is that of a master/slave network where CCU 12 is the master and an audio, video, and data system having at least one analog component is the slave. In this example, the audio, video, and data system includes a cassette player 14, plural auxiliary units collectively denoted 16, a tuner 18, speakers 20, a compact disk (CD) player 22, a digital signal processor (DSP) 24, a laser disc (LD) player 26, a digital versatile disc (DVD) 27, plural video inputs collectively denote 28, a video cassette recorder (VCR) 30, a television set 32, and a data device such as a printer 33.

The total number of components that can be interconnected in accordance with the teachings of this invention is 65, 536 (2 to the sixteenth power). The components can be classified into 256 (2 to the eighth power) categories where each category consists of 256 components. However, only eleven categories are currently in use. The following eleven categories identify all existing audio, video, and data equipment:

| Category No. | Category Description |
|---|---|
| 1 | Audio Play/Record |
| 2 | Audio Play Only |
| 3 | Audio Record Only |
| 4 | Video Only Play/Record |
| 5 | Video Only Play |
| 6 | Video Only Record |
| 7 | Audio/Video Play/Record |
| 8 | Audio/Video Play |
| 9 | Audio/Video Record |
| 10 | Data Devices |
| 11 | CCU |

As mentioned earlier, the individual components may have internal circuitry that is analog or digital in design. The following table indicates how existing audio, video, and data components may be classified:

| Component | Audio Play | Audio Rec | Video Play | Video Rec | Category |
|---|---|---|---|---|---|
| Cassette | X | X | | | 1 |
| CD | X | | | | 2 |
| VCR | X | X | X | X | 7 |
| Tuner | X | | | | 2 |
| LCD | X | | X | | 8 |
| TV (analog or digital) | X | X | X | X | 7 |
| Record player | X | | | | 2 |
| DSP Unit | X | X | | | 1 |
| Equalizer X | X | | | 1 | |
| Speaker/Amplifier | | X | | | 3 |
| Monitor | | | X | X | 4 |
| DSS/Cable box | X | | X | | 8 |
| Printer | | | | | ? |
| CCU | | | | | ? |

Figure 2:
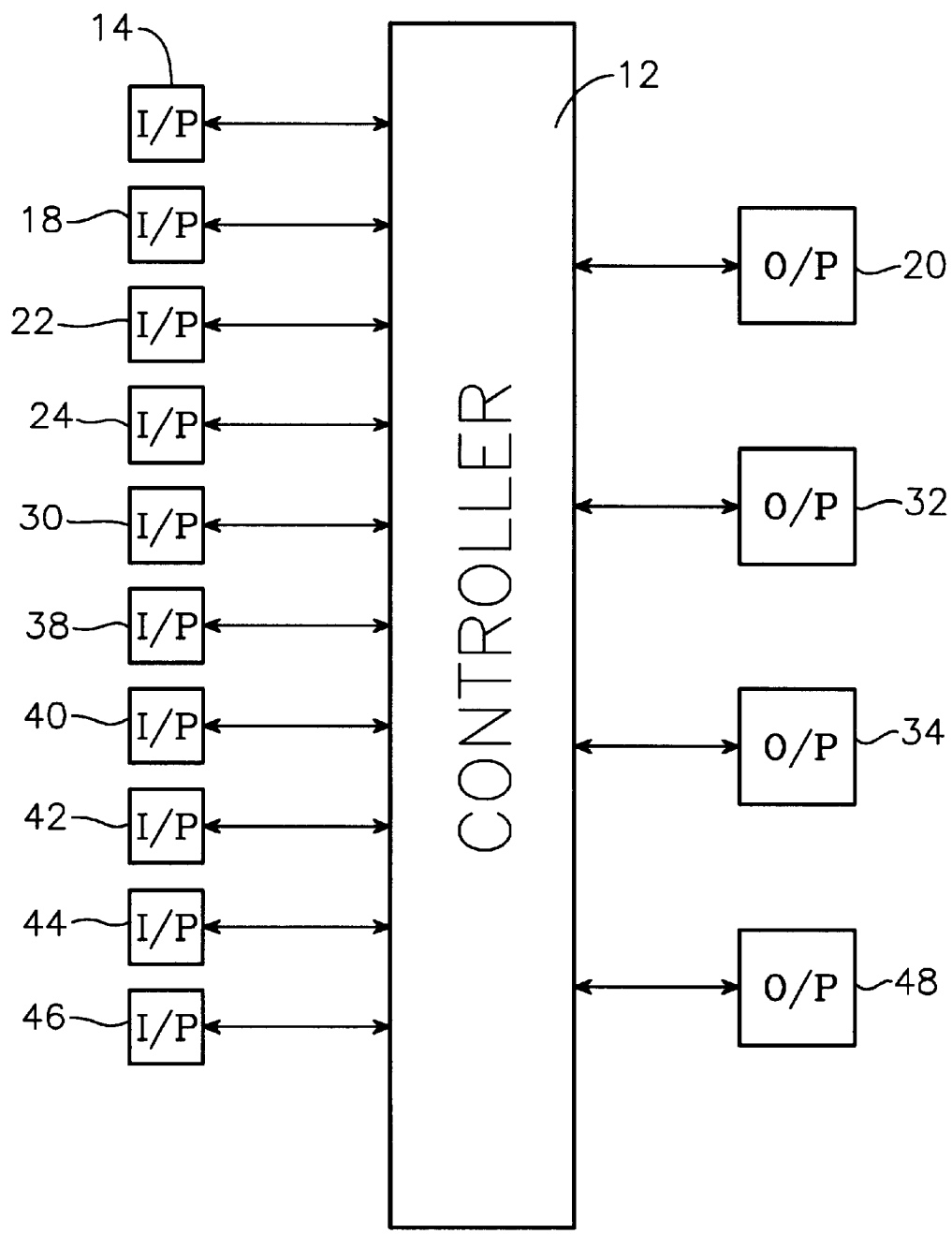
FIG. 2 is a diagram depicting how devices primarily used as input devices and those primarily used as output devices are connected to the controller of the novel digital stereo network.

Most components may be classified as both Playing or Input and Recording or Output devices. However, speakers and analog amplifiers can only be classified as Output devices whereas radio tuners and CD players are pure Input devices. Other components such as TV sets are predominately used as Output devices but some sets are wired to have both Input and Output capabilities. FIG. 2 depicts this classification scheme. In this particular example, the input devices are cassette player 14, tuner 18, CD 22, DSP 24, VCR 30, equalizer 38, DSS/Cable box 40, CCU 42, LCD 44, and monitor 46. The output devices are speaker 20, TV 32, analog amplifier 34, and monitor 48.

In the novel apparatus, all analog signals generated by analog components are converted to digital signals and encoded prior to transmission to CCU 12, and the encoded digital signals generated by CCU 12 are transmitted to the analog components in digital form and decoded and converted to analog signals at the input of the component.

Components having internal digital circuits, and having a digital output, such as CD, LCD, and DVD players, already generate digital signals so their signals may not need to be converted prior to transmission to CCU 12 and the digital signals from the CCU to such components need not be converted.

The component digital output signals are grouped into packets of data and transmitted through a digital network.

The bandwidth of the United States NTSC, standard analog TV signal, is 6 MHz per channel; by the Nyquist Theorem, this translates into 12 M samples per second. With 24 bit samples, a minimum speed of 288 Mbits per second is required, without applying any digital compression, to transmit analog TV signals through a digital media. For analog stereo signals, the bandwidth is between 20 Hz–20 KHz which translates to 40 K samples per second. With 24 bit samples, and without applying digital compression, the digital transmission speed should be 960 Kbits per second.

By applying the Digital Television compression standard, this translates into 5 to 8 Mbits per second digital data transmission speed. The Digital Television Compression Standard is based on the ISO/IEC IS 13818 International Standard, MPEG-2 Video Standard, the Digital Audio Compression (AC-3) Standard, and the ISO/IEC MPEG-2 Systems Standard. To compress audio signals alone with AC-3 standard, the data transmission speed will most likely be less than 300 kbits per second.

To process at least one video signal and multiple audio signals, a data transmission speed range of 10–150 Mbits per second is needed; conventional fiber media transmits data at speeds far in excess of that rate. The novel digital stereo network 10 employs a single fiber optic cable as the preferred data transmission means, but it will still work if media such as coax cable, twisted pairs, wireless, or the like are used. By employing conventional digital signal compression, the novel apparatus processes multiple video and audio signals simultaneously.

The communication protocol for DAVieS 10 is similar to the protocol used by computer network communications. However, it is simpler because the components of DAVieS 10 can only answer requests generated by CCU 12; none of the components can generate requests as can the components in a conventional computer network. Thus, the communication between CCU 12 and the components is termed "synchronous" because conventional networks are asynchronous, i.e., they involve random access communication between components.

Moreover, conventional computer networks are typically linked with other computer networks, thereby adding another level of complexity to the protocol. The novel DAVieS of this invention is not in cross network communication with other DAVieSs and for this additional reason the novel protocol is less complex than known computer network protocols.

Since a conventional computer local area network (LAN) uses a seven layer communication model, the novel DAVieS can use the same protocol with many unused features, or the novel DAVieS may use a five layer communication model where the five layers are physical, data, transport, presentation and application layers.

FIG. 3 depicts the relationships between the five layers of the communication protocol for the novel DAVieS.

The primary function of physical layer 50 is to control the Input and Output (I/O) devices that put data onto and retrieve data from the physical wires, cables, or other media, including wireless.

The function of data layer 52 is to create data frames. Data layer 52 receives a series of bits of data, i.e., a bit stream 50A, from physical layer 50 and reconstructs the bits into data frames 60 and sends said data frames to transport layer 54 for further analysis. Similarly, data layer 52 receives outbound data from transport layer 54 and calculates an error correction code. It then packs the data into a data frame and delivers it to physical layer 50 for transmission.

Data layer 52 also regulates DAVieS traffic by queueing data before transmitting it since only one data frame can be sent at any one time. A data frame 60 is depicted in FIG. 4.

As indicated in FIG. 4, each frame 60 begins with a Preamble 62 that is used to synchronize clocks between the sender and the receiver components. The size of the Preamble field varies depending upon the speed of the communication network.

A Starting Delimiter field 64 marks the beginning of the frame boundary. It contains analog encoding of signals other than 0s and 1s so that they cannot occur accidentally in application data.

Frame Control (FC) field 66 consists of two bytes and is used to distinguish between different types of frames. For example, frames include control frames, normal audio data frames, normal video data frames, video and audio (e.g, MPEG-2 and AC-3) compressed video, and audio data frames with header information (e.g., a typical header might request that data be sent to multiple addresses). There are many other types of frames as well. A two byte Frame Control field can distinguish up to 65,536 unique data frames.

A one byte Destination Type (or Destination Flag) field 68 is used to identify up to fifteen recipient addresses which are to be followed by a data frame. Destination Type field 68 also identifies up to sixteen types of broadcasting method. Examples of broadcasting methods include brosdcasting to all components (e.g., broadcasting of timing or synchronization signals), broadcasting to all speakers, broadcasting to all TV sets, and so on. The following table explains how the Destination Type field is used:

| Field Bit Value | Field Description |
| --- | --- |
| 0000 0001 | One destination address |
| 0000 0010 | Two destination addresses |
| 0000 1111 | Fifteen destination addresses |
| 0001 0001 | Broadcast to one set of addresses - addresses having the same first 14 bits as the Destination address |
| 0010 0011 | Broadcast to three sets of addresses - addresses having the same first 12 bits as one of the Destination addresses |
| 1111 0000 | Broadcast to all addresses - No Destination address in this case |

With the exception of the broadcast-to-all signal, the Destination Address field 70 consists of 1–15 addresses; each address requires two bytes of storage. Broadcasting and multiple addresses are used when there is a plurality of components in the apparatus that use the data frame for the same or different purposes, such as recording and/or display, e.g. The two byte address scheme enables the apparatus to be scaleable up to 65,536 components.

The Source Address field 72 is in the same format as the Destination Address 70 except it identifies the data sender instead of the data receiver. The receiving component uses the sender address to send reply data to the sender.

Data Field 74 follows Source Address field 72. The data length is theoretically unlimited, but for practical reasons a maximum length of 64 K is recommended.

Check Sum field 76 is used to detect data transmission errors. It uses Cyclic Redundancy Code (CRC), a check sum algorhithm also used in conventional computer network communication protocol.

End Delimiter field 78 marks the end of the frame boundary. Like Starting Delimiter 64, it includes analog encoding of signals other than 0s and 1s so that they do not occur accidentally in the application data.

The length of the data may be calculated based upon the Starting and End Delimiters 64, 78. It is posgible to have data of unlimited length, but for practical purposes the length of the application data field should be less than 65,636 bytes.

Thus, data layer 52 recreates the bit stream from physical layer 50 into a frame 60 with the FIG. 4 format. Data layer 52 then delivers the frames to transport layer 54 for further processing.

Transport layer 54 (FIG. 3) identifies the source and destination addresses of inbound and outbound data. Thus, the transport layer may also be thought of as the access controller means of a component; it grants access to a component based upon the destination address and frame type of the inbound data. Transport layer 54 strips the inbound address information from a data frame and adds the destination and source addresses to an outbound data frame.

Transport layer 54 also receives each data frame from data layer 52 as aforesaid and identifies the destination of the data frame and compares the destination address with the predetermined component address. If said addresses match, the control frame is extracted to identify control characteristics of the frame. For example, a cassette player may not have an internal clock; accordingly, time information is not used by such component.

Transport layer 54 then passes each data frame 60 to presentation layer 56 for further processing. The transport layer also receives outbound data from presentation layer 56, adds the frame control bytes, the destination address, and the source address to the data frame. The data is then presented to data layer 52 for sending.

Presentation layer 56 performs coding and decoding of transmission data. It receives inbound data from transport layer 54. Based upon the format provided by frame control bytes, presentation layer 56 performs data decompression as required. It also compresses outbound data, if required, from application layer 58 for transmission by the transport layer. Some of the compression methods are specified by MPEG-1, MPEG-2, AC-3, ATSC standard A52, etc.

Application layer 58 converts data from digital signals to analog signals and vice versa. Reference numeral 58A indicates an analog signal that is sampled and digitized into a digital signal 58B. For inbound data, the signal conversion process first extracts data from data frames 60 to produce a continuous data stream. DDA devices are then used to convert the bits of data into analog signals for use by a component's analog circuit. For outbound data, ADE devices first convert the analog signals from an analog component to digital signals. The data is then grouped into frames for transmission by presentation layer 56.

For components having digital internal circuitry, application layer 58 provides a continuous bit stream of data to the internal circuitry or to presentation layer 56.

Novel system 10 employs two communication methods: In accordance with the first method, CCU 12 broadcasts information or data to all or a preselected number of the components that collectively form DAVieS 10. In accordance with the second method, CCU 12 sends out control frames to one or more components to request transmission of data from the component or to request that said component or components receive data from the CCU. The data may be a control signal such as time of day, for example. Significantly, all components of the DAVieS 10 react to CCU 12 commands, i.e., said components do not communicate asynchronously with CCU 12.

DAVieS 10 begins functioning only after CCU 12 has been turned on. Before power is delivered to CCU 12, the master and the components or slaves will not interact with the CCU or each other. As indicated in FIG. 5, using left and right audio information as an example, after it has been activated, CCU 12 sends a timing signal to synchronize all components on DAVieS 10; in this example timing signals 61, 63, 71, 73 are sent to all units. The CCU then sends a control signal to each component such as set-time, turn-on, turn-off, send data, receive data, and other specialized commands. In this example, left audio information from the CCU to the left speaker is sent as at 69 and right audio information from the CCU to the right speaker is sent as at 79. Control signals from the CCU that request data are sent to the respective inputs of the components; in this example, a Request Tuner for Left Audio Information to be sent to the CCU is denoted 65 and the same Request for Right Audio Information is denoted 75. Control signals from the CCU that send data are sent to the outputs of said components. In the example of FIG. 5, reference numeral 69 indicates Left Audio Information from the CCU to the left speaker and reference numeral 79 represents Right Audio Information from the CCU to the right speaker. The CCU may also request from an input component that data be sent to a processing component such as a digital signal processor. However, all new messages must originate with the CCU.

CCU 12 controls data flow on DAVieS 10 by regulating the speed of data transmission and the size of data transmission, i.e., it serves as a traffic controller. CCU 12 also provides the time of day and date information to all on-line components. The CCU could also be used as a digital signal processor since almost all audio and video signals must go through the CCU to reach a component such as a speaker or a TV set, so it is advantageous for the CCU to process the digital signals as well.

Operating CCU 12 as a digital signal procesor also reduces overall DAVieS 10 traffic, thereby freeing up more bandwidth for data transmission.

Figure 6:
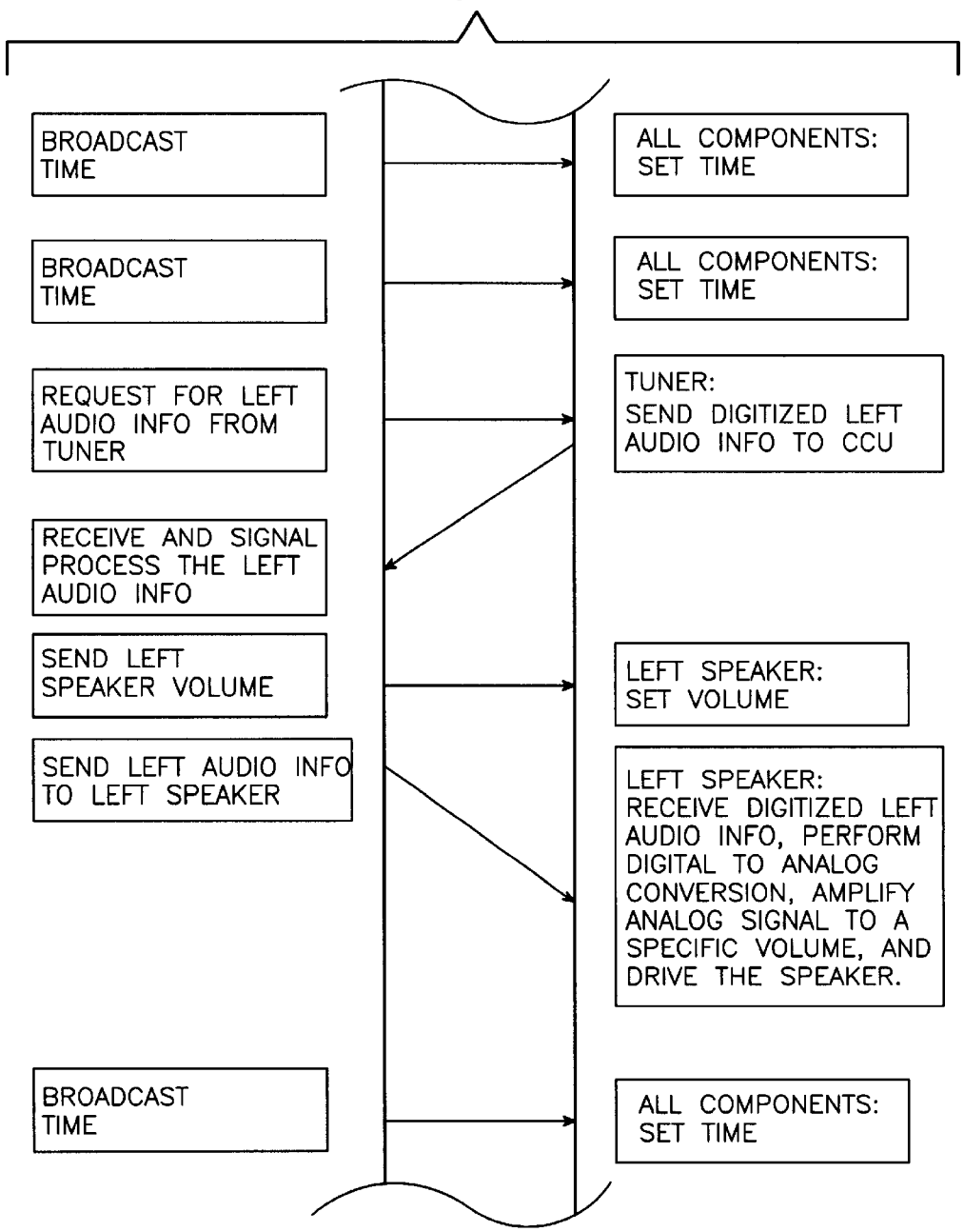
FIG. 6 diagrammatically depicts how the controller of the novel network and the various components in the audio and video system communicate with one another.

FIG. 6 diagrams the communication between CCU 12 and one of the components of DAVieS 10. Preferably, the time is broadcast twice as indicated by the CCU and the component reacts by setting the time twice; the second time is for redundancy, i.e., just in case the first signal to set time was missed for any reason. In the example of FIG. 6, CCU 12 next sends a request for left audio information from the component, which in this example is tuner 18. The tuner reacts by sending digitized left audio information to CCU 12. The CCU receives and signal processes the left audio information. It then sends a signal to set the volume of the left speaker, and the left speaker reacts by setting the volume. CCU 12 then sends digitized left audio information to the left speaker. The left speaker receives the left audio information, a DDA device positioned at the input of the speaker converts it to analog, and an amplifier amplifies the analog signal to a specific volume, and drives the speaker. The CCU then broadcasts the time again and a similar set of control signals such as those depicted in FIG. 6 is repeated.

Figure 7A:
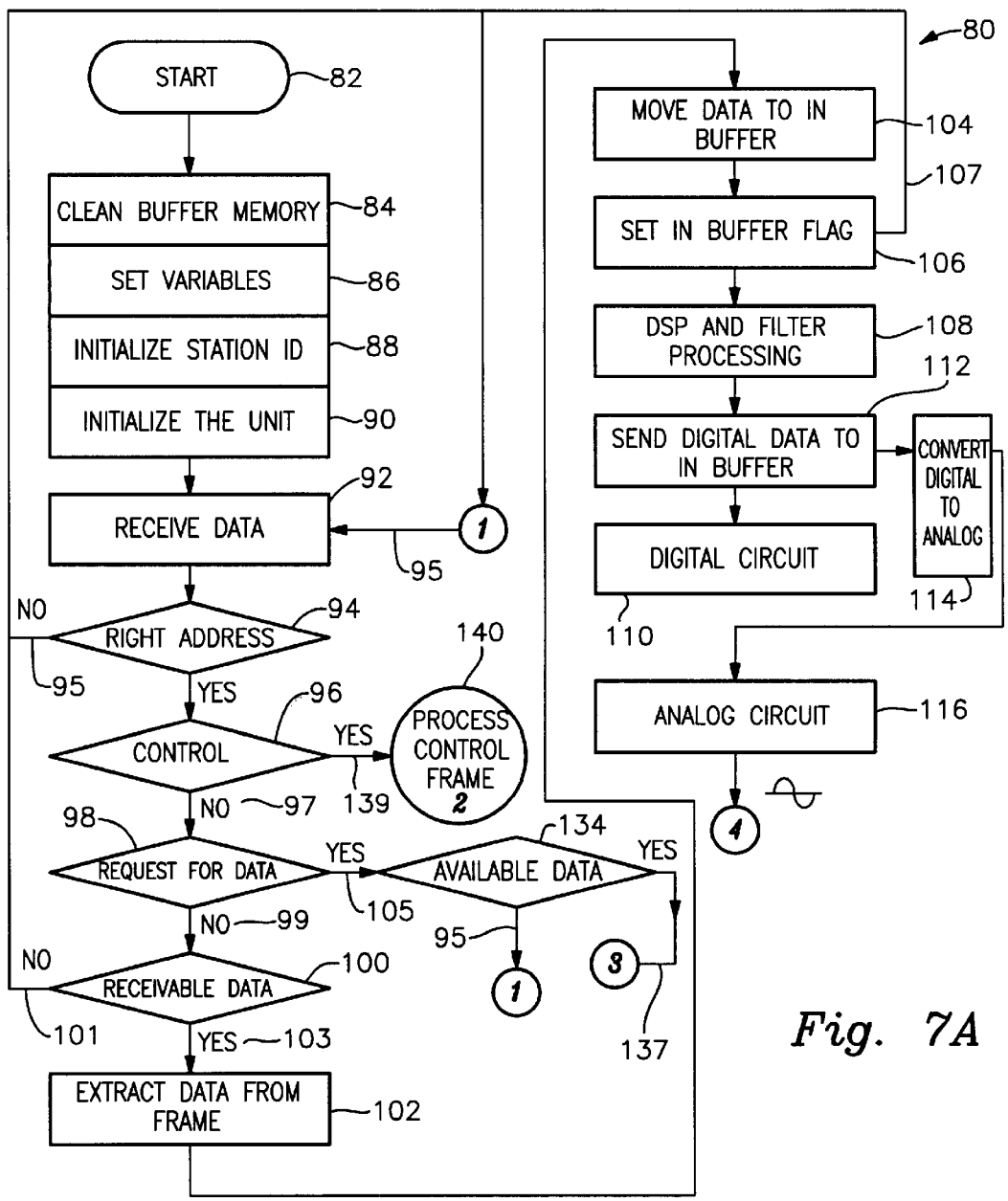
FIG. 7A is a flowchart of the steps performed by the novel apparatus.
Figure 7B:
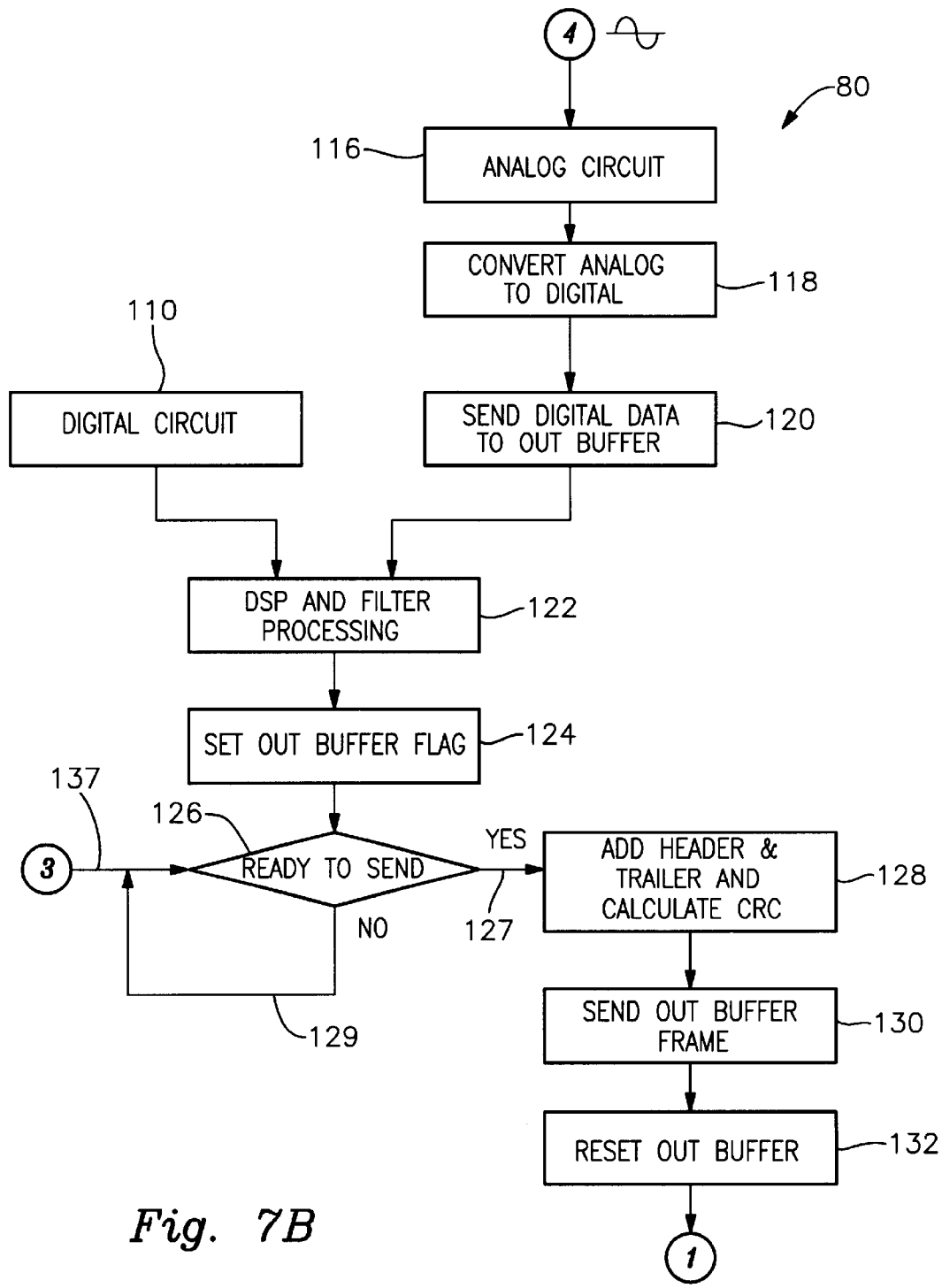
FIG. 7B is a continuation of the flowchart of FIG. 7A.
Figure 7C:
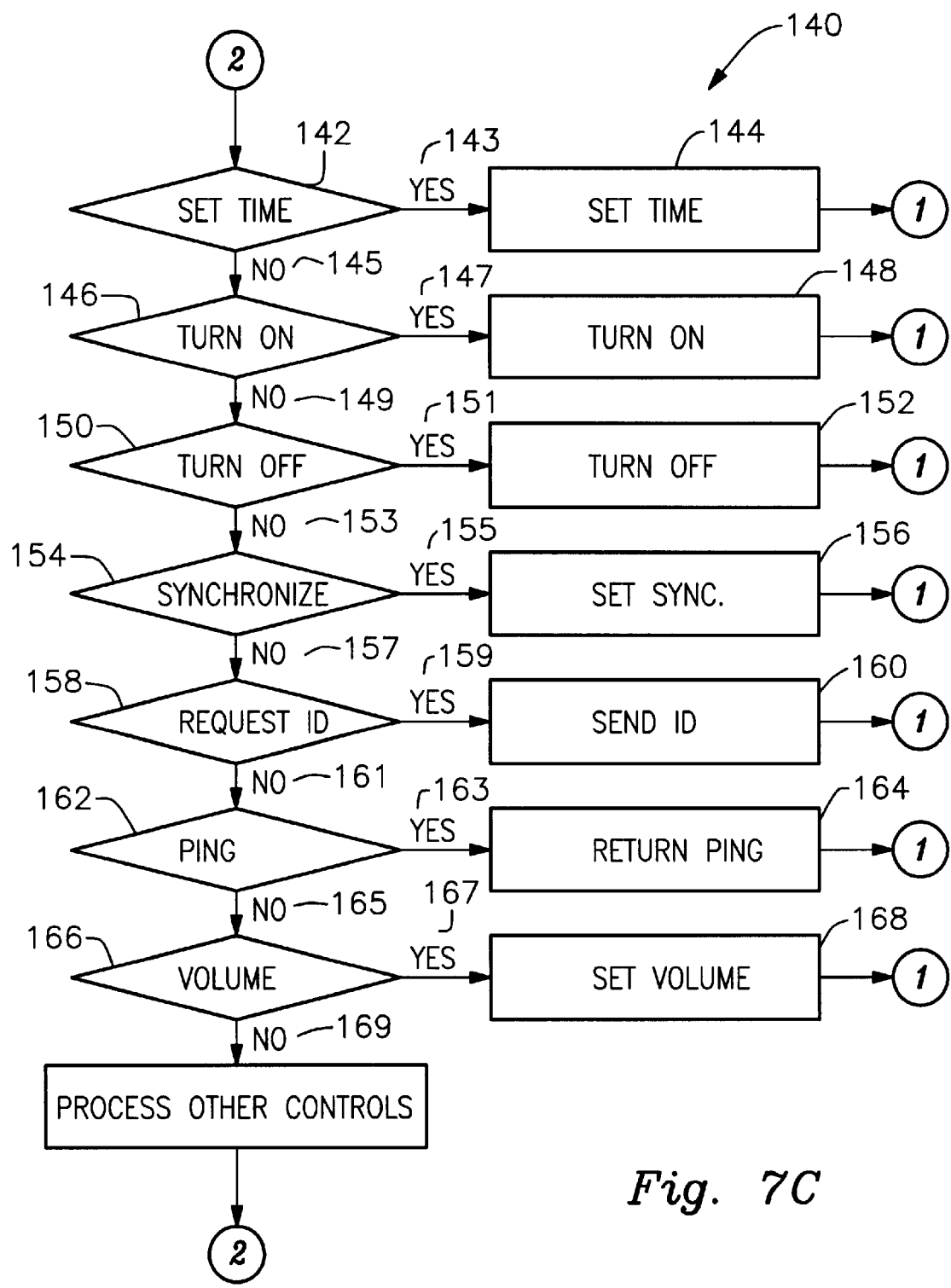
FIG. 7C is a flowchart depicting the steps performed by the control frames of the novel apparatus.

Each component should have the same communication protocol. FIGS. 7A, 7B, and 7C disclose in flowchart form, how the data are processed.

More particularly, program 80 begins at Start block 82 and flows to function block 84 where the buffer memory is erased by a Clean Buffer Memory instruction so that old commands in the CCU buffer memory are deleted. The program then flows to function block 86 where a Set Variables instruction performs the function its name expresses. At function block 88, an Initialize Station ID signal performs that function, and units are initialized at function block 90. A command instructing all components to receive data from CCU 12 is sent to the components when the program flows to Receive Data function block 92.

When data arrives at a component, a decision is made at decision block 94 as to whether or not the data has arrived at the correct address. If it has not, the data is discarded and the program flows along No path 95, returning to the input of Receive Data function block 92, and waits for the data to arrive. If the address is correct, the program flows to decision block 96; at this time, the program decides whether or not the signal is a control signal as distinguished from a request for data signal. If it is not a control signal, the program flows along No path 97 to decision block 98 where it is determined whether or not the signal from the CCU is a request for data from the component at that particular address. If it is not, the program flows along No path 99 to decision block 100 where a determination is made as to whether or not the data is in receivable form because if it is not a control signal or a request for data signal, then the data may be corrupted. If it is determined that the data is not in receivable form, the program discards the data and flows along No path 101 and returns to the input of Receive Data function block 92. If the data is determined to be in receivable form, the program flows alone Yes path 103 and said data is extracted from its data frame at Extract Data From Frame function block 102, moved to a buffer at Move Data to In Buffer function block 104, and an identification flag is associated with such data at Set In Buffer Flag function block 106. The program then flows along path 107 to the input of Receive Data function block 92 and the above-recited steps are repeated for new incoming data. The program also flows to DSP and Filter Processing function block 108 where the expressed functions are performed. If the data, which is in digital form because CCU 12 generates only digital signals, is to be sent to a component having an internal digital circuit (such as a CD player, for example), then the program flows to said digital circuit of said component as indicated by block 110. If the data is bound for a component having an internal analog circuit, such as a speaker, the program flows to Send Digital Data to In Buffer function block 112 where the data awaits sending to function block converter 114 where the step of converting data to analog form is performed. The data exits function block 114 in analog form and is applied to the analog circuit of the component as at 116.

If decision block 98 determines that the signal from CCU 12 is a request for data, the program flows along Yes path 105 to Available Data decision block 134. If the component is unable to send data, the program flows along No path 95 to the input of Receive Data function block 92. If it is determined that the component is capable of sending data, the program flows along Yes path 137 to Ready to Send? decision block 126 (FIG. 7B). If the available data is not ready to send, the program returns along No path 129 to the input of Ready to Send? decision block 126 and waits for the data. The loop is continued until the data is ready to send, whereupon it follows Yes path 127 and is handled as set forth in the following paragraph.

As indicated in the upper righthand corner of FIG. 7B, after the analog data has been applied to the analog circuit 116, the program flows to function block 118 where analog data is converted to digital data The program then flows to function block 120 entitled Send Digital Data to Out Buffer where it awaits transfer to DSP and Filter Processing means 122; note that the input of DSP and Filter Processing function block 122 is also connected to digital circuit 110. The program then flows to Set Out Buffer Flag function block 124 that marks the data as ready to send. It is then determined whether or not the data is ready to be sent at the Ready to Send? decision block 126. If the answer is in the affirmative, the program flows along Yes path 127 to Add Header and Trailer and Calculate CRC function block 128 which performs those functions. The data frame is sent to an out buffer at Send Out Buffer—Frame function block 130, and the program then flows to Reset Out Buffer function block 132 which performs that function. The program then flows to the input of Receive Data function block 92.

If the decision is made at decision block 96 (FIG. 7A) that the signal from CCU 12 is a control signal, the program flows along Yes path 139 to a process, also disclosed in flowchart form, for processing control frames. That process is disclosed in FIG. 7C and is denoted 140 as a whole.

It is first determined at decision block 142 whether or not the control signal from the CCU is a set time signal. If the decision is made in the affirmative, the program flows along Yes path 143 and the time is set by means represented by Set Time function block 144. The program then flows to the input of Receive Data function block 92. If the signal is determined to be a signal other than a set time signal, the program flows along No path 145 to decision block 146 where it is determined whether or not the signal is a command to deliver power to the component. If it is determined that the signal is a turn-on signal, the program flows along Yes path 147 to Turn On function block 148 where suitable means performs that function. The program then flows to the input of Receive Data function block 92.

If the signal is determined to be a signal other than a turn on signal, the program flows along No path 149 to decision block 150 where it is determined whether or not the signal is a command to terminate power to the component. If it is determined that the signal is a Turn-Off signal, the program flows along Yes path 151 to Turn Off function block 152 where suitable means performs that function. The program then flows to the input of Receive Data function block 92.

If the signal is determined to be a signal other than a Turn-Off signal, the program flows along No path 153 to decision block 154 where it is determined whether or not the signal is a Synchronize command. If it is determined that the signal is a synchronize signal, the program flows along Yes path 155 to Set Synchronization function block 156 where suitable synchronization means performs that function. The program then flows to the input of Receive Data function block 92.

If the signal is determined to be a signal other than a synchronize signal, the program flows along No path 157 to decision block 158 where it is determined whether or not the signal is a request identification signal. If it is determined that the signal is a Request ID signal, the program flows along Yes path 159 to Send ID function block 160 where suitable means is employed to send the ID of the component to the CCU. The program then flows to the input of Receive Data function block 92.

If the signal is determined to be a signal other than a Request ID signal, the program flows along No path 161 to decision block 162 where it is determined whether or not the signal is a Ping signal from CCU 12. If it is determined that the signal is a Ping signal, the program flows along Yes path 163 to Return Ping function block 164 where suitable means returns the Ping to CCU 12. The program then flows to the input of Receive Data function block 92.

If the signal is determined to be a signal other than a Ping signal, the program flows along No path 165 to decision block 166 where it is determined whether or not the signal is a command to set the volume of the component. If it is determined that the signal is a Set Volume signal, the program flows along Yes path 167 to Set Volume function block 168 where suitable means performs that function. The program then flows to the input of Receive Data function block 92.

If it is determined that the signal is not a Set Volume signal, the program flows along No path 169 to still another decision block, like decision blocks 142, 146, 150, 154, 158, 162, and 166, and the process as described above continues until all of the commands from the CCU have been indentifed and carried out.

It will thus be seen that the objects set forth above, and those made apparent from the foregoing description, are efficiently attained.

Since certain changes may be made in the foregoing method without departing from the scope of the invention, it is intended that all steps contained in the foregoing method or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An apparatus interconnecting a network of audio and video components in a master/slave relationship so that one master controls all of said audio and video components, comprising:

a central control unit for controlling a plurality of audio and video components, said central control unit having digital internal circuitry;

a single transmission path for interconnecting the central control unit to each component of said plurality of audio and video components, said single transmission path including as many logical transmission paths as there are audio and video components;

each of said audio and video components having digital internal circuitry and being under the control of said central control unit so that no signal travels from a component to said central control unit and so that no signal travels between components unless said central control unit commands a component to send a signal;

said central control unit being adapted to transmit digital commands to said plurality of audio and video components in accordance with a predetermined communication protocol;

whereby all command signals in said network are digital and are therefore not subject to noise of the type associated with analog signal transmission;

whereby said audio and video components may be remotely positioned from said central control unit and from each other without introducing noise; and whereby installation and interconnection of home entertainment center audio and video components is facilitated.

2. The apparatus of claim 1, further comprising:

at least one component in said network of audio and video components having analog internal circuitry;

at least one decoder—digital-to-analog means for decoding and converting digital signals from the central control unit to analog signals at the input of said at least one component having analog internal circuitry, said at least one decoder—digital-to-analog means being under the control of said central control unit so that no signal travels from said at least one component having analog internal circuitry to said central control unit and so that no signal travels between said at least one component having analog internal circuitry and other components of said plurality of audio and video components unless said central control unit commands said at least one component having internal analog circuitry and said other audio and video components of said plurality of audio and video components to send a signal; and at least one analog-to-digital—encoder means for converting and encoding analog signals from said at least one component having analog internal circuitry to digital signals, said at least one analog-to-digital—encoder means being positioned at the output of said at least one component having analog internal circuitry, said at least one analog-to-digital—encoder means being under the control of said central control unit so that no signal travels from said at least one component having internal analog circuitry to said central control unit unless said central control unit commands said at least one component having analog internal circuitry to send a signal.

3. The apparatus of claim 2, further comprising an error detection and correction means that is operative during transmission of digital signals from said central control unit to said respective components to provide error free digital signals and that is operative during transmission of digital signals from said respective components to said central control unit to provide error free digital signals.

4. The apparatus of claim 3, wherein said predetermined communication protocol includes a physical, a data, a transport, a presentation, and an application layer.

5. The apparatus of claim 4, further comprising a plurality of input and output devices that put data onto and retrieve data from said predetermined signal transmission media, said physical layer being adapted to control said plurality of input and output devices.

6. The apparatus of claim 5, wherein said data layer comprises:

means for receiving a series of bits of data from said physical layer and for reconstructing said bits of data with error correction into data frames; and means for sending said data frames to said transport layer.

7. The apparatus of claim 6, wherein said data layer further comprises:

means for receiving outbound data from said transport layer;

means for calculating an error correction code;

means for packing said outbound data and said error correction code into a data frame; and means for delivering one data frame at a time to said physical layer for transmission.

8. The apparatus of claim 7, wherein said transport layer further comprises:

identifying means for identifying source and destination addresses of inbound and outbound data;

said identifying means including means for stripping inbound address information from a data frame; and said identifying means including means for adding destination and source addresses to an outbound data frame.

9. The apparatus of claim 8, wherein said transport layer further comprises:

comparison means for comparing a destination address of a data frame with a preselected component address; and control frame extracting means for extracting control information from a data frame when the destination address of said data frame matches the preselected component address.

10. The apparatus of claim 9, wherein said transport layer further comprises:

means for sending data to said presentation layer;

means for receiving outbound data from said presentation layer;

means for adding said extracted control information to said data frame; and means for sending said data frame to said data layer.

11. The apparatus of claim 10, wherein said presentation layer comprises:

means for decoding inbound data from said transport layer; and means for coding outbound data from said application layer for subsequent transmission by said transport layer.

12. The apparatus of claim 11, wherein said application layer comprises means for converting analog signals to digital signals and grouping converted data into data frames for transmission by said presentation layer.

13. The apparatus of claim 12, wherein said application layer further comprises means for converting digital signals to analog signals, including means for extracting data from said data frames to form a continuous stream of data bits and then converting the data bits into analog signals.

14. The apparatus of claim 13, wherein each of said data frames includes a preamble for synchronizing clocks between components.

15. The apparatus of claim 14, wherein each of said data frames includes a starting delimiter and an end delimiter for marking the boundaries of a data frame.

16. The apparatus of claim 15, wherein said starting and end delimiters include means for analog encoding of symbols other than 0s and 1s.

17. The apparatus of claim 16, wherein said data frames include differing types of data frames and wherein each of said data frames includes frame control means for distinguishing between said different types of data frames.

18. The apparatus of claim 17, wherein said data frames include means for identifying a predetermined plurality of recipient addresses and means for identifying a plurality of broadcasting methods employed by said central control unit.

19. The apparatus of claim 18, wherein said data frames include means for identifying the address of said central control unit so that said central control unit address is used by said components to send reply data to said central control unit.

20. The apparatus of claim 19, wherein said data frames include a data field.

21. The apparatus of claim 20, wherein said data frames include means for detecting data transmission errors.

22. An apparatus interconnecting a network of audio and video components in a master/slave relationship so that one master controls all of said audio and video components, comprising:

a central control unit for controlling a plurality of audio and video components, said central control unit having digital internal circuitry;

a single transmission path for interconnecting the central control unit to each component of said plurality of audio and video components, said single transmission path including as many logical transmission paths as there are audio and video components;

at least one of said audio and video components having digital internal circuitry and being under the control of said central control unit so that no signal travels from a component to said central control unit and so that no signal travels between components unless said central control unit commands a component to send a signal;

at least one of said audio and video components having analog internal circuitry and being under the control of said central control unit so that no signal travels from a component to said central control unit and so that no signal travels between components unless said central control unit commands a component to send a signal;

at least one decoder—digital-to-analog means for decoding and converting digital signals from the central control unit to analog signals at the input of said at least one component having analog internal circuitry, said at least one decoder—digital-to-analog means being under the control of said central control unit so that no signal travels from said at least one component having analog internal circuitry to said central control unit and so that no signal travels between said at least one component having analog internal circuitry and other components of said plurality of audio and video components unless said central control unit commands said at least one component having internal analog circuitry and said other audio and video components of said plurality of audio and video components to send a signal;

at least one analog-to-digital—encoder means for converting and encoding analog signals from said at least one component having analog internal circuitry to digital signals, said at least one analog-to-digital—encoder means being positioned at the output of said at least one component having analog internal circuitry, said at least one analog-to-digital—encoder means being under the control of said central control unit so that no signal travels from said at least one component having internal analog circuitry to said central control unit unless said central control unit commands said at least one component having analog internal circuitry to send a signal;

said central control unit being adapted to transmit digital commands to said plurality of audio and video components in accordance with a predetermined communication protocol;

whereby all command signals in said network are digital and are therefore not subject to noise of the type associated with analog signal transmission;

whereby said audio and video components may be remotely positioned from said central control unit and from each other without introducing noise; and whereby installation and interconnection of home entertainment center audio and video components is facilitated.

23. An apparatus interconnecting a network of audio and video components in a master/slave relationship so that one master controls all of said audio and video components, comprising:

a central control unit for controlling a plurality of audio and video components, said central control unit having digital internal circuitry;

a single transmission path for interconnecting the central control unit to each component of said plurality of audio and video components, said single transmission path including as many logical transmission paths as there are audio and video components;

each of said audio and video components having analog internal circuitry and being under the control of said central control unit so that no signal travels from a component to said central control unit and so that no signal travels between components unless said central control unit commands a component to send a signal;

a decoder—digital-to-analog means for decoding and converting digital signals from the central control unit to analog signals at the input of each of said components, each decoder—digital-to-analog means being under the control of said central control unit so that no signal travels from said components to said central control unit and so that no signal travels between said components unless said central control unit commands said components to send a signal;

an analog-to-digital—encoder means for converting and encoding analog signals from each component to digital signals, each of said analog-to-digital—encoder means being positioned at the output of each of said components, each of said analog-to-digital—encoder means being under the control of said central control unit so that no signal travels from said components to said central control unit unless said central control unit commands said components to send a signal;

said central control unit being adapted to transmit digital commands to said plurality of audio and video components in accordance with a predetermined communication protocol;

whereby all command signals in said network are digital and are therefore not subject to noise of the type associated with analog signal transmission;

whereby said audio and video components may be remotely positioned from said central control unit and from each other without introducing noise; and whereby installation and interconnection of home entertainment center audio and video components is facilitated.

* * * * *